(12) United States Patent
Harrington et al.

(10) Patent No.: US 11,025,365 B1
(45) Date of Patent: Jun. 1, 2021

(54) SATELLITE FORWARD LINK NON-LINEAR NOISE AND APSK I/Q IMBALANCE ERROR CANCELLATION USING ARTIFICIAL INTELLIGENCE

(71) Applicant: HUGHES NETWORK SYSTEMS, LLC, Germantown, MD (US)

(72) Inventors: Emanuel Harrington, Germantown, MD (US); Frank Li, Germantown, MD (US); Ying Wang, Germantown, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 0 days.

(21) Appl. No.: 16/730,692

(22) Filed: Dec. 30, 2019

(51) Int. Cl.
*H04L 27/01* (2006.01)
*H04L 27/22* (2006.01)
*G06N 20/00* (2019.01)
*H04L 1/00* (2006.01)

(52) U.S. Cl.
CPC ........... *H04L 1/0047* (2013.01); *G06N 20/00* (2019.01); *H04L 27/01* (2013.01); *H04L 27/22* (2013.01)

(58) Field of Classification Search
CPC ....... H04L 1/0047; H04L 27/22; H04L 27/01; H04L 25/03165; G06N 20/00
See application file for complete search history.

(56) References Cited

U.S. PATENT DOCUMENTS

| | | | |
|---|---|---|---|
| 10,616,011 B1* | 4/2020 | Mirfakhraei | H04L 25/0328 |
| 2003/0054755 A1* | 3/2003 | Zehavi | H04K 3/228 455/1 |
| 2005/0157822 A1* | 7/2005 | Khandekar | H04L 27/3488 375/340 |
| 2006/0085727 A1* | 4/2006 | Azenkot | H04L 5/12 714/792 |
| 2006/0146925 A1* | 7/2006 | Birru | H04L 25/03057 375/233 |
| 2012/0263163 A1* | 10/2012 | Burzigotti | H04L 27/0014 370/344 |
| 2015/0043323 A1* | 2/2015 | Choi | G06F 17/11 370/203 |
| 2017/0033164 A1 | 11/2017 | Urie et al. | |

(Continued)

OTHER PUBLICATIONS

David Poole et al., Artificial Intelligence—Foundations of Computational Agents—11.3.3 Q-learning, 2010.

(Continued)

*Primary Examiner* — Aristocratis Fotakis
(74) *Attorney, Agent, or Firm* — Jones Robb, PLLC

(57) ABSTRACT

Embodiments for a method and apparatus are described for non-linear noise cancelation and in phase quadrature (I/Q) modulation error correction. The embodiments include receiving a signal, the signal including a plurality of data segments. A first data segment in the received signal is demodulated and decoded to produce a recovered segment of a bitstream. At least one correction factor is applied to a first demodulation support element and a second demodulation support element during demodulation of a second data segment in the received signal. The correction factor is determined based on the received first data segment and a representation of the first data segment reconstructed from the recovered segment of the bitstream.

18 Claims, 12 Drawing Sheets

(56) References Cited

U.S. PATENT DOCUMENTS

2017/0331644 A1* 11/2017 Urie ................... H04L 25/0204
2018/0167133 A1* 6/2018 Choquette .......... H04B 7/18543

OTHER PUBLICATIONS

Mahendran Venkatachalam, Q-Learning, Introduction through a simple table based implementation with learning rate, discount factor and exploration, Oct. 3, 2019.
Elias Nemer et al., An iterative feedback algorithm for correcting the I/Q imbalance in DVB-S receivers, Jan. 2004.
Svilen Dimitrov, Estimation and Cancellation of Transponder Distortions in Satellite Forward Links Using Memory Polynomials, Article in International Journal of Satellite Communications and Networking, Apr. 2018.
WikipediA, Q-learning, https://en.wikipedia.org/wiki/Q-learning.
Daniel J. Costello, Jr., An Introduction to Low-Density Parity Check Codes, Department of Electrical Engineering, University of Notre Dame, Aug. 10, 2009.
Ralph Brooker, Make Sense of Nonlinear Distortion Part 1: Viewing distortion as a modulation effect, Jan. 21, 2014.
Elias Nemer, Physical layer impairments in DVB-S2 receivers, Feb. 2005.
N. Kelly et al., Bandwidth-Constrained Digital Pre-compensation Technique for Multi-carrier Satellite Communications, 2015.
International Search Report and Written Opinion issued in corresponding Application No. PCT/US2020/067570, dated Feb. 10, 2021.

* cited by examiner

SATELLITE FORWARD LINK NON-LINEAR NOISE AND APSK I/Q IMBALANCE ERROR CANCELLATION USING ARTIFICIAL INTELLIGENCE

BACKGROUND INFORMATION

Modern communication technologies have enabled delivery of multimedia services (e.g., voice, data, video, etc.) to end-users over various delivery platforms, including terrestrial wire-line, fiber, wireless communications and networking technologies, and satellite communications and networking technologies. The relatively recent proliferation of mobile communications has spurred growth in the demand for such enhanced multimedia services over fixed and mobile communications networks (both terrestrial and satellite based). Developments in both fixed and mobile wireless communications have enabled consumers to remain connected without the need to have a wired connection. For example, satellite communication systems allow consumers to access voice and data services from virtually any global location. Such accessibility can be beneficial for consumers who are located in, or must travel to, areas that cannot be serviced by other (e.g. terrestrial) communication systems. As part of the growing demand, service providers of voice and communication networks are faced with requests for seemingly endless levels of bandwidth by consumers and content providers. Consumers utilize devices such as mobile phones, tablets, computers, etc. to obtain various types of content which can often require greater bandwidth and a higher quality of service than required only a short period of time earlier.

To address the growing demand for these services, several standards organizations have enacted specifications associated with the transmission and reception of fixed and mobile wireless signal. One such standard, the Digital Video Broadcasting (DVB) standard DVB-S2 is a digital satellite transmission system standard covering a variety of data and multimedia services delivered over satellite communications systems. The DVB-S2 standard also covers various technological features including a flexible input stream adapter that can utilize Adaptive Coding and Modulation (ACM) functionality for optimizing channel coding and modulation on a frame-by-frame basis. The transmission equipment and transmission channel environment associated with satellite signals can introduce signal impairments that remain in the signal when received at user terminals. These impairments in the received signal place a performance strain on signal receiving circuit in user terminals, particularly when receiving signals adhering to the DVB-S2 standard.

Typically, several signal demodulation support circuits are employed to mitigate or remove these impairments. The signal demodulation support circuits can have shortcomings, including, but not limited to, constraints on types or areas of impairments that can be processed and time response limiting control or feedback loops. Further, the signal demodulation circuits often operated independently, limiting collective mitigation capability. These shortcomings can limit the data throughput or data rate for the signal and restrict the range of possible modulation type or forward error corrections that can be used when encoding the signal for transmission. Based on the foregoing, there is a need to improve the performance of the signal receiver in terminals (such as satellite terminals) and, in particular, the impairment mitigation performance of the demodulator in the receiver.

BRIEF SUMMARY

A method and apparatus are disclosed for non-linear noise cancelation and in phase quadrature (I/Q) modulation error correction. According to an embodiment, the method includes: receiving a signal, the signal including a plurality of data segments; demodulating a first data segment in the received signal; decoding the demodulated first data segment to produce a recovered segment of a bitstream; and applying at least one correction factor to a first demodulation support element and a second demodulation support element during demodulation of a second data segment in the received signal, the at least one correction factor being based on the received first data segment and a representation of the first data segment reconstructed from the recovered segment of the bitstream; applying a deep learning algorithm to compare the received first data segment and the representation of the first data segment and generating the at least one correction factor for the first demodulation support element and the second demodulation support element using the received first data segment and the representation of the first data segment, wherein the first demodulation support element is an I/Q balancer and the second demodulation support element is a signal synchronizer.

According to an embodiment, the apparatus includes: an input circuit that receives a signal including a plurality of data segments; a demodulator coupled to the input circuit, the demodulator demodulating a first data segment in the received signal; a decoder coupled to the demodulator, the decoder decoding the demodulated first data segment to produce a recovered segment of a bitstream; and an error cancellation module coupled to the demodulator and the decoder. The error cancellation module being configured to: apply at least one correction factor to a first demodulation support element and a second demodulation support element during demodulation of a second data segment of the signal, the correction factor being based on the received first data segment and a representation of the first data segment reconstructed from the recovered segment of the bitstream, apply a deep learning algorithm to compare the received first data segment and the representation of the first data segment; and generate the at least one correction factor for the first demodulation support element and the second demodulation support element using the received first data segment and the representation of the first data segment, wherein the first demodulation support element is an I/Q balancer and the second demodulation support element is a signal synchronizer.

The foregoing summary is only intended to provide a brief introduction to selected features that are described in greater detail below in the detailed description. As such, this summary is not intended to identify, represent, or highlight features believed to be key or essential to the claimed subject matter. Furthermore, this summary is not intended to be used as an aid in determining the scope of the claimed subject matter.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DETAILED DESCRIPTION

A method and apparatus for demodulating and decoding a received signal capable of improving data throughput for devices such as a terminal are described. In the following description, for purposes of explanation, numerous specific details are set forth in order to provide a thorough understanding of the disclosed embodiments. It will become apparent, however, to one skilled in the art that various embodiments may be practiced without these specific details or with an equivalent arrangement. In other instances, well-known structures and devices are shown in block diagram form in order to avoid unnecessarily obscuring the various embodiments.

The present embodiments are directed to improving bandwidth efficiency (e.g., data throughput, quality of service, etc.) in a terminal of a wireless communication network, such as a satellite communication network. The embodiments apply correction factors to demodulation support elements during demodulation of data segments or symbols in a received signal at the terminal. These demodulation support elements can include an I/Q balance element, a synchronization element, a linear equalization element a non-linear equalization element, and the like. These elements are included for mitigating the presence of signal impairments such as additional noise, distortion, and/or interference introduced through the equipment used for transmitting the signal as well as the transmission channel through which the signal passes.

Figure 1:
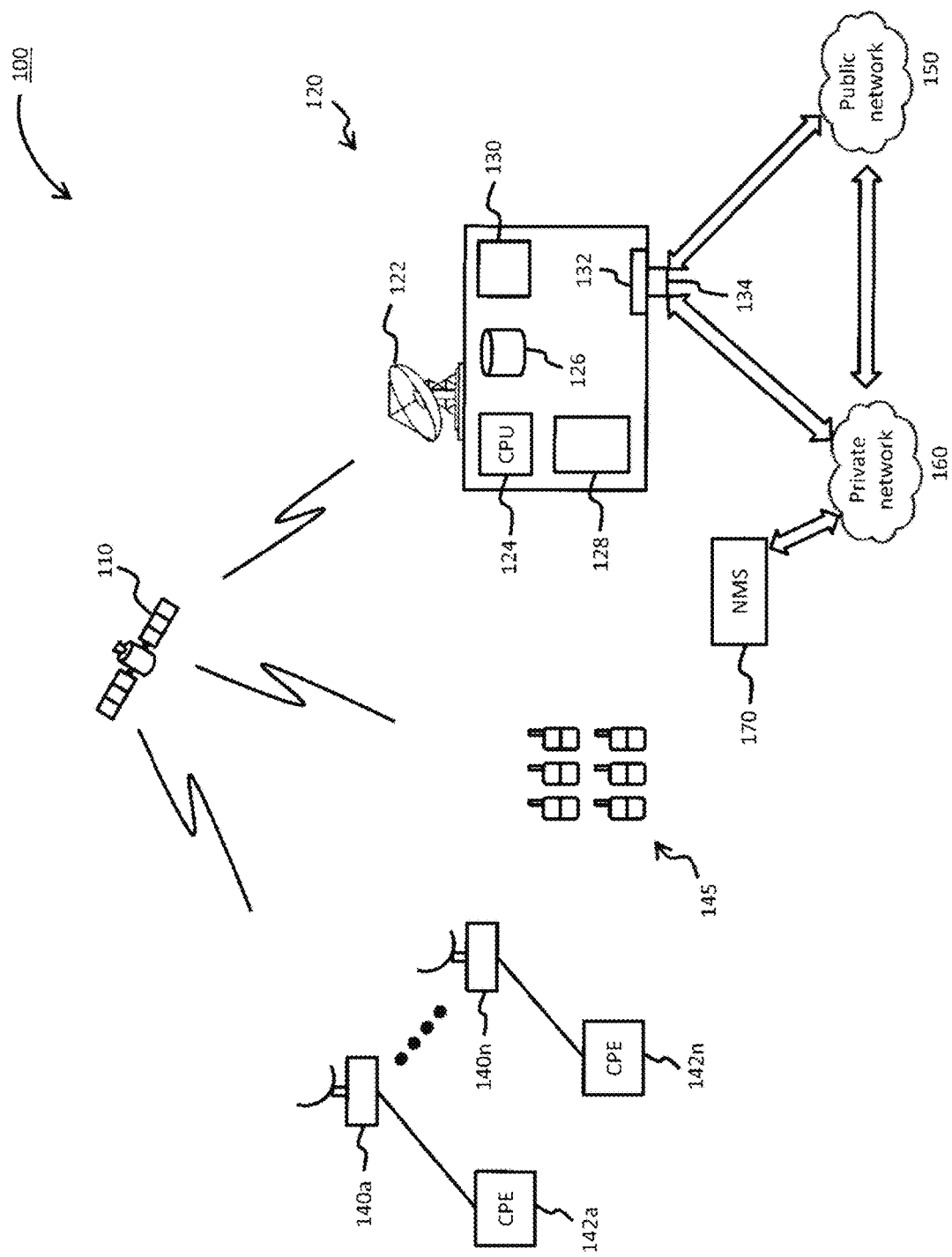
FIG. 1 is a diagram of a system capable of providing voice and data services, according to at least one embodiment.

The mechanism described by the present embodiments analyzes the relation between the input data received in the signal and error correction decoder output data for every data segment, or symbol, in real time or using data stored in memory to make segment-based (or symbol-based) noise and error correction equations and correction factors that are used to control or adjust the demodulator data recovery for the next data segment or symbol. The processing can be performed using the real time data or can include all or portions of data that are stored in memory. In some embodiments, the mechanism can include deep learning functions associated, for example, with artificial intelligence (AI) operations. The mechanism can enhance noise, distortion, and/or interference cancellation along with forward error correction capability as part of recovering signals that include noise, distortion, and/or interference from impairments that may not otherwise be mitigated or eliminated. In some embodiments, such as user terminals that employ ACM as part of DVB-S2 signal transmission, the mechanism can be used to increase forward communication (e.g., satellite communication) link speed and data or bandwidth efficiency. For instance, the user terminal can send a request back through the communication network to provide subsequent data segments encoded with a different, less robust set of transmit parameters as part of the transmitted signal. This different set of transmit parameters can be less robust than the set of transmit parameters that would be used if no correction factors were applied FIG. 1 illustrates a satellite communication system 100 capable of providing voice and data services. The satellite communication system 100 includes a satellite 110 that supports communications among a number of gateways 120 (only one shown) and multiple stationary satellite terminals 140a-140n. Each satellite terminal (or terminal) 140 can be configured for relaying traffic between its customer premise equipment (CPEs) 142a-142n (i.e., user equipment), a public network 150, such as the internet, and/or its private network 160. Depending on the specific embodiment, the CPEs 142 can be a desktop computer, laptop, tablet, cell phone, etc. CPEs 142 can also be in the form of connected appliances that incorporate embedded circuitry for network communication can also be supported by the satellite terminal (or terminal) 140. Connected appliances can include, without limitation, televisions, home assistants, thermostats, refrigerators, ovens, etc. The network of such devices is commonly referred to as the internet of things (IoT).

According to an exemplary embodiment, the terminals 140 can be in the form of very small aperture terminals (VSATs) that are mounted on a structure, habitat, etc. Depending on the specific application, however, the terminal 140 can incorporate an antenna dish of different sizes (e.g., small, medium, large, etc.). The terminals 140 typically remain in the same location once mounted, unless otherwise removed from the mounting. According to various embodiments, the terminals 140 can be mounted on mobile platforms that facilitate transportation thereof from one location to another. Such mobile platforms can include, for example, cars, buses, boats, planes, etc. The terminals 140 can further be in the form of transportable terminals capable of being transported from one location to another. Such transportable terminals are operational only after arriving at a particular destination, and not while being transported.

As illustrated in FIG. 1, the satellite communication system 100 can also include a plurality of mobile terminals 145 that are capable of being transported to different locations by a user. In contrast to transportable terminals, the mobile terminals 145 remain operational while users travel from one location to another. The terms user terminal, satellite terminal, terminal may be used interchangeably herein to identify any of the foregoing types. The gateway 120 can be configured to route traffic from stationary, transportable, and mobile terminals (collectively terminals 140) across the public network 150 and private network 160 as appropriate. The gateway 120 can be further configured to route traffic from the public network 150 and private network 160 across the satellite link to the appropriate terminal 140. The terminal 140 then routes the traffic to the appropriate CPE 142.

According to at least one embodiment, the gateway 120 can include various components, implemented in hardware, software, or a combination thereof, to facilitate communication between the terminals 140 and external networks 150, 160 via the satellite 110. According to an embodiment, the gateway 120 can include a radio frequency transceiver (RFT) 122, a processing unit 124 (or computer, central processing unit (CPU), etc.), and a data storage unit 126 (or storage unit). While generically illustrated, the processing unit 124 can encompass various configurations including, without limitations, a personal computer, laptop, server, etc. As used herein, a transceiver corresponds to any type of antenna unit used to transmit and receive signals, a transmitter, a receiver, etc. The RFT 122 is useable to transmit and receive signals within a communication system such as the satellite communication system 100 illustrated in FIG. 1. The data storage unit 126 can be used, for example, to store and provide access to information pertaining to various operations in the satellite communication system 100. Depending on the specific implementation, the data storage unit 126 (or storage unit) can be configured as a single drive, multiple drives, an array of drives configured to operate as a single drive, etc.

According to other embodiments, the gateway 120 can include multiple processing units 124 and multiple data storage units 126 in order to accommodate the needs of a particular system implementation. Although not illustrated in FIG. 1, the gateway 120 can also include one or more workstations 125 (e.g., computers, laptops, etc.) in place of, or in addition to, the one or more processing units 124. Various embodiments further provide for redundant paths for components of the gateway 120. The redundant paths can be associated with backup components capable of being seamlessly or quickly switched in the event of a failure or critical fault of the primary component.

According to the illustrated embodiment, the gateway 120 includes baseband components 128 which operate to process signals being transmitted to, and received from, the satellite 110. For example, the baseband components 128 can incorporate one or more modulator/demodulator units, system timing equipment, switching devices, etc. The modulator/demodulator units can be used to generate carriers that are transmitted into each spot beam and to process signals received from the terminals 140. The system timing equipment can be used to distribute timing information for synchronizing transmissions from the terminals 140.

According to an embodiment, a fault management unit 130 can be included in the gateway 120 to monitor activities and output one or more alerts in the event of a malfunction in any of the gateway components. The fault management unit 130 can include, for example, one or more sensors and interfaces that connect to different components of the gateway 120. The fault management unit 130 can also be configured to output alerts based on instructions received from a remotely located network management system 170 (NMS). The NMS 170 maintains, in part, information (configuration, processing, management, etc.) for the gateway 120, and all terminals 140 and beams supported by the gateway 120. The gateway 120 can further include a network interface 132, such as one or more edge routers, for establishing connections with a terrestrial connection point 134 from a service provider. Depending on the specific implementation, however, multiple terrestrial connection points 134 may be utilized.

Figure 2:
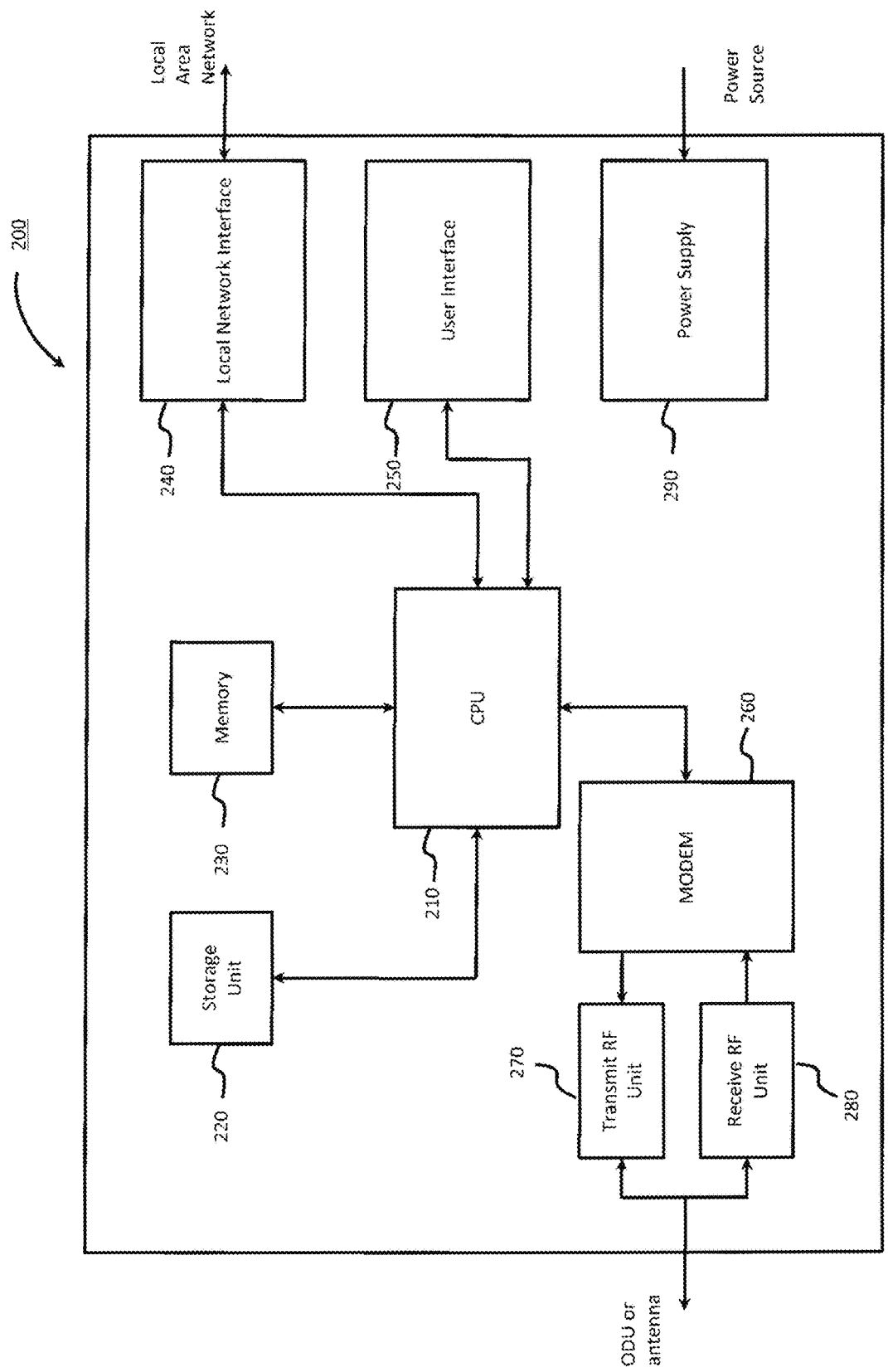
FIG. 2 is a diagram of a terminal such as used in the system of FIG. 1, according to one embodiment.

FIG. 2 is a diagram of an exemplary configuration for a terminal 200 capable of implementing signal reception improvements, according to one embodiment. Depending on the specific implementation, terminal 200 can be configured to operate as a fixed satellite terminal 140 (e.g., VSAT), a mobile terminal 145, a transportable terminal, etc. In terminal 200, a CPU 210 is coupled to a storage unit 220, a memory 230, a local network interface 240, a user interface 250, and a modem 260. Modem 260 is further coupled to a transmit radio frequency (RF) unit 270 and a receive RF unit 280. Although not shown, power supply 290 can be coupled to each of the blocks shown in terminal 200 that require local electrical power. It should be noted that terminal 200 can include various additional components which perform conventional operations. Such components are well known to those skilled in the art and are omitted in order to provide better clarity and conciseness in describing the novel features of terminal 200.

CPU 210 can include one or more specifically built processing elements and/or general purpose processors configured or programmed to perform specific tasks associated with the operation, control, and management of activity in terminal 200. Storage unit 220 can be any one of several large and/or removable storage elements including, but not limited to, magnetic disk, and optical disk. Memory 230 can be any type of electronic circuit or small scale based storage elements including, but not limited to read-only memory (ROM), erasable electrically programmable ROM (EEPROM), random-access memory (RAM), non-volatile RAM (NVRAM), flash memory, or other similar memory technology. Storage unit 220 and/or memory 230 can be used to store instructions or software code used by CPU 210 and data associated with operation of terminal 200. Storage unit 220 can also be used for longer term storage of data and/or multimedia content transmitted and/or received through modem 260 or local network interface 240. Memory unit 230 can be used for shorter term or temporary storage of data and/or multimedia content needed for, or associated with, signal and data processing in terminal 200.

Local network interface 240 includes circuit elements configured for interfacing to one or more home networks and/or other similar local area networks (LANs). Local network interface 240 also includes interface components for connecting to the home networks and/or LANS either through a wired medium or wirelessly. Local network interface 240 receives data and/or multimedia content, along with processing instructions, from CPU 210 for delivery to devices such as CPEs 142 on the home and/or local area networks. For example, a CPE 142 such as a home computer in a user's local home network employing Ethernet protocols can be interfaced to local network interface 240 through a registered jack (RJ) type 45 receptacle using category 5 (CAT 5) cable or later variants (e.g. CAT 6, CAT 7, etc.). Further, a CPE 142 such as a user's cell phone can be connected wirelessly to local network interface 240 through an antenna (not shown) in order to utilize terminal 200 as a Wi-Fi signal router, repeater, or hotspot.

User interface 250 can include a user input or entry mechanism, such as a set of buttons on an infrared/RF/Bluetooth remote controller, a keyboard, or a microphone. User interface 250 can also include circuitry for converting user input signals into a data communication format to provide to processor 210. User interface 250 can further include some form of user notification mechanism to show device functionality or status, such as indicator lights, a speaker, or a display. User interface 250 can also include circuitry for converting data received from processor 210 to signals that may be used with the user notification mechanism.

Modem 260 performs functions necessary for modulating and demodulating a signal to/from transmit RF unit 270 and receive RF unit 280. These elements and/or functions can include, but are not limited to, digital signal conditioning, symbol mapping, demapping, data error correction encoding/decoding, and transport stream processing for interfacing data to and from the CPU 210. According to various embodiments, modem 260 can perform the modulating/demodulating functions independently or under control of the CPU 210. Transmit RF unit 270 processes the digital signal from modem 260 to form an analog signal for transmission through a satellite dish included as part of an outdoor unit (ODU) or an antenna (not shown). Receive RF unit 280 processes the analog signal received through the satellite dish or antenna to form a digital signal that is further processed in modem 260. The processing elements or functions in transmit RF unit 270 and receive RF unit 280 include, but are not limited to, signal amplification, filtering frequency up/downconversion, and analog to digital signal or digital to analog signal conversion.

In one embodiment, the received satellite signal, operating in the Ka or Ku frequency bands, is first block downconverted to the L band frequency range using very high frequency components in the ODU (not shown). The received satellite signal can be encoded using one or more sets of transmit parameters, including a set of transmit parameters associated with terminal 200. The downconverted received signal in the L band frequency range is provided to receive RF unit 280, where it is processed to provide a digital signal representing the received signal. Modem 260 processes the digital signal to produce a transport stream containing data that is associated with or, for delivery to, one or more user devices on a local area network. Modem 260 can further apply additional processing, such as deep learning functions, to generate additional correction factors for use in demodulating signals received at satellite terminal 200. For example, the additional processing can include generating correction factors to mitigate or remove the presence of undesired signal energy, such as I/Q balance errors, synchronization mistracking, and signal non-linearities or distortion, in the received signal during demodulation. The data recovered from the received signal is processed in CPU 210 and provided to local network interface 240 for delivery to the one or more devices.

Further, data from the one or more devices is provided to CPU 210 through local network interface. CPU 210 processes the data to form a transport stream and provides the transport stream to modem 260. CPU 210 can also generate messages for the satellite gateway and add them to the transport stream. Such messages can include, for example, requests to change the set of transmit parameters associated with terminal 200, system messages, status reports, etc. Modem 260 processes the transport stream to produce a digital signal representing a signal for transmission as a satellite signal. The digital signal is provided to transmit RF unit 270, which processes the digital signal to form an analog signal in the L band frequency range. Transmit RF unit 270 provides the L band signal to the ODU for block upconversion and transmission as a satellite signal in the KA or Ku frequency bands. While FIG. 2 illustrates components such as modem 260, transmit RF unit 270, and receive RF unit 280, within terminal 200, it should be noted that various embodiments can allow for part or all of one or more of these components to be included in the ODU. Further, parts of one or more components may be combined or rearranged without altering the overall function and purpose of terminal 200. Thus, the specific arrangement shown in FIG. 2 should only be considered as illustrative and is in no way intended to be restrictive.

Figure 3:
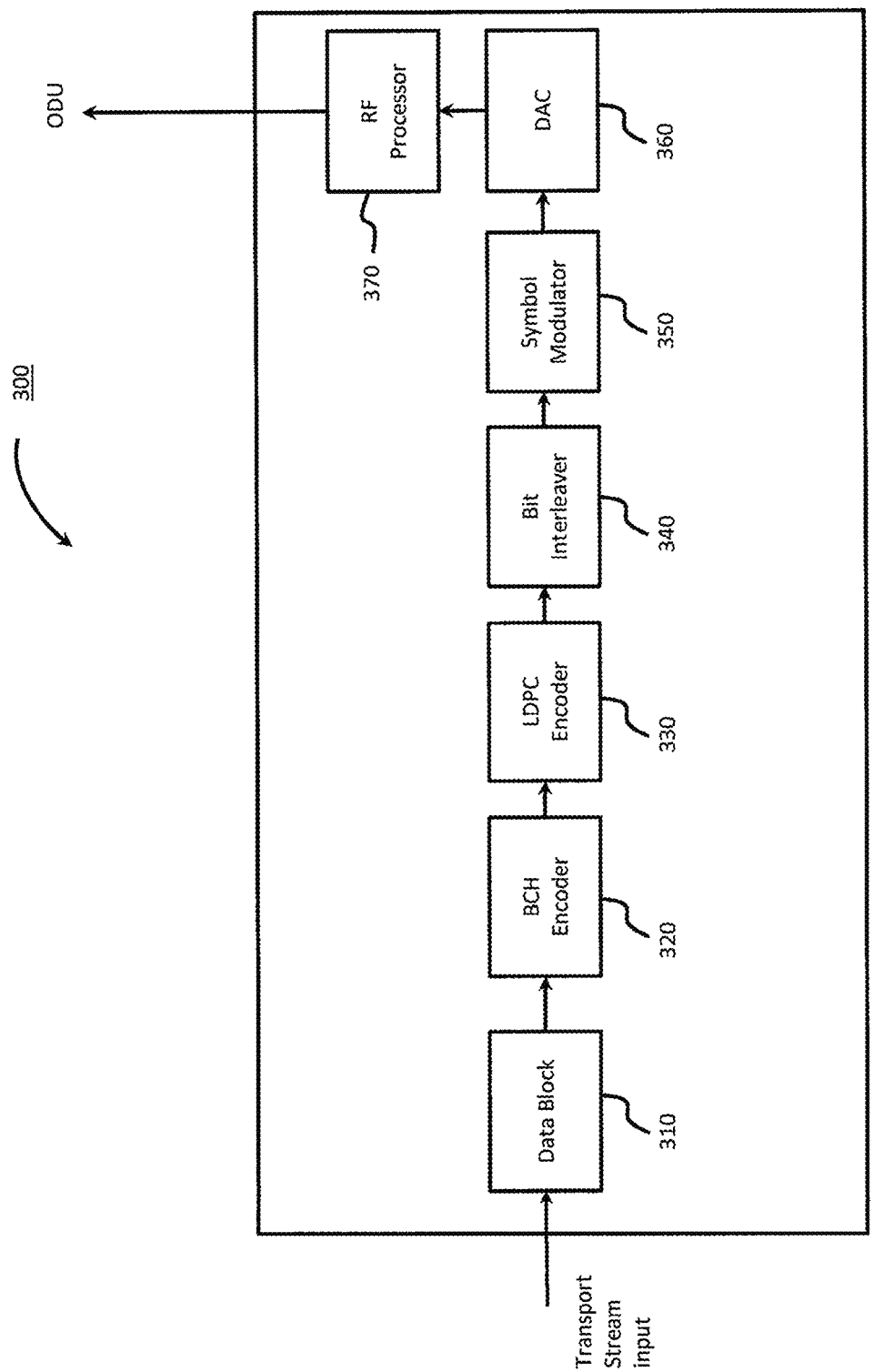
FIG. 3 is a diagram of a transmitter such as used in the terminal of FIG. 2, according to one embodiment.

FIG. 3 is a diagram of an exemplary transmitter 300 that can be configured to operate as part of the terminal in FIG. 2, in accordance with one embodiment. In transmitter 300, data block 310 provides an interface for the received transport stream. Data block 310 is coupled to BCH encoder 320. BCH encoder 320 is coupled to Low Density Parity Check (LDPC) encoder 330. LDPC encoder 330 is coupled to bit interleaver 340. Bit interleaver 340 is coupled to symbol modulator 350. Symbol modulator 350 is coupled to digital-to-analog converter (DAC) 360. DAC 360 is coupled to RF processor 370, which provides a signal to an ODU such as an RF transmitter.

Data block 310 receives the transport stream data and performs layer encapsulation to form baseband data frames or data blocks. Data block 310 can also insert information associated with processing of the signal, such as terminal identification information and/or one or more transmit parameters used for processing and/or encoding portions of the signal. BCH encoder 320 processes the baseband data frames by adding additional redundant information based on one or more of the BCH encoding algorithms used in conjunction with the signal transmission protocol. The additional redundant information, referred to as error correction information, can be used for correction of errors introduced by the transmission of the signal over the transmission channel or link during signal reception. LDPC encoder 330 further processes the BCH encoded data frames to add a second layer of redundant information, or error correction information, to the data frames for error correction using one or more LDPC algorithms. Bit interleaver 340 processes the data frames including the two layers of error correction to rearrange sections (e.g., bits) of the data frames with respect to location or position (i.e., in time) within the data frames to provide some additional error correction capability during reception to due short term signal interference events. Symbol modulator 350 arranges the bits within the frames into symbols representing positions (i.e., in amplitude, phase, and/or time) in a modulated signal waveform based a symbol constellation map for the modulation type. DAC 360 converts the digital signal, arranged into symbols, to an analog signal, typically at or near the baseband frequency range. RF processor 370 filter, amplifies and upconverts the analog signal to produce a signal in the L band frequency range and provide the signal to an ODU for transmission.

Figure 4:
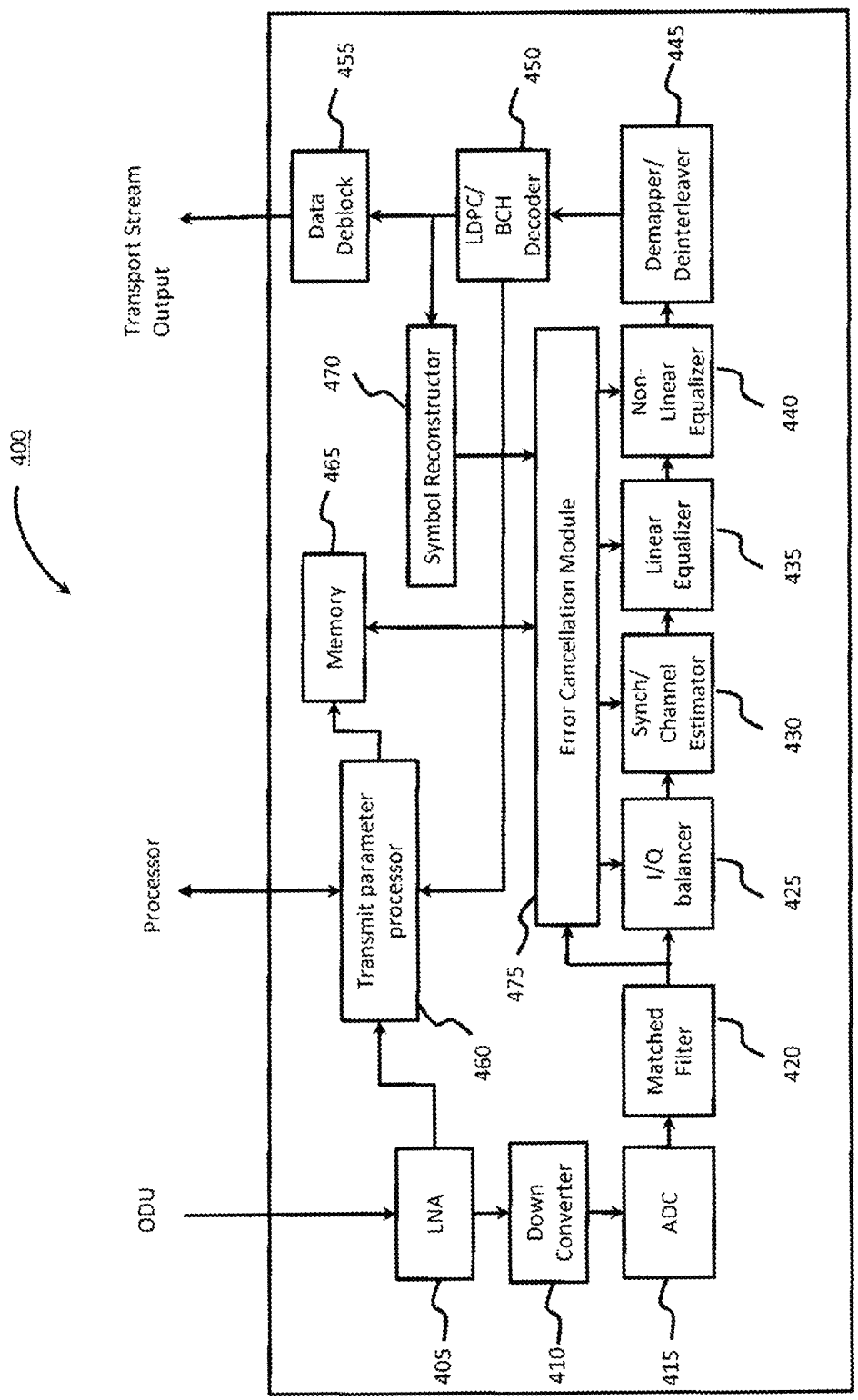
FIG. 4 is a diagram of a receiver such as used in the terminal of FIG. 2, according to one embodiment.

FIG. 4 is a diagram of an exemplary receiver 400 that can be configured to operate as part of the terminal in FIG. 2, in accordance with one embodiment. In receiver 400, the satellite signal received by the ODU is provided as an input to low noise amplifier (LNA) 405. LNA 405 is coupled to downconverter 410. Downconverter 410 is coupled to analog-to-digital converter (ADC) 415. ADC 415 is coupled to matched filter 420. Matched filter 420 is coupled to I/Q balancer 425. I/Q balancer 425 is coupled to synchronization (synch)/channel estimator 430. Synch/channel estimator 430 is coupled to linear equalizer 435. Linear equalizer 435 is coupled to non-linear equalizer 440. Non-linear equalizer 440 is coupled to demapper/deinterleaver 445. Demapper/deinterleaver 445 is coupled to LDPC/BCH decoder 450. LDPC/BCH decoder 450 is coupled to data deblock 455 which provides a transport stream output signal. LDPC/BCH decoder 450 is also coupled to symbol reconstructor 470. Both symbol reconstructor 470 and matched filter 420 are coupled to error cancellation module 475. Error cancellation module 475 is coupled to I/Q balancer 425, synch/channel estimator 430, and linear equalizer 435. Although not shown in FIG. 4, the error cancellation module 475 is also coupled to memory 465 in order to store and retrieve information while processing the received satellite signal. Further, transmit parameter processor 460 is coupled to LNA 405 and LDPC/BCH decoder 450 as well as memory 465. Transmit parameter processor 460 can also include an interface to a processor in the terminal (e.g., CPU 210 as part of terminal 200 in FIG. 2).

LNA 405 receives the received signal in the L band frequency range, and filters and amplifies the signal to remove other signal energy not within the frequency range of a desired portion of the signal. Depending on the specific implementation, the received signal in the L band frequency range can contain a plurality of individual signals arranged into channels or transponders. Downconverter 410 frequency converts the filtered signal, referred to as the desired signal (e.g., a channel or transponder), to a frequency range at or near the baseband frequency range. Downconverter 410 can also provide additional filtering, if necessary. Typically, not all of the plurality of individual signals contain data associated with, or intended for use by, the terminal that includes receiver 400. Data in the signal that is associated with, or intended for use by, the terminal can be based on requests made through user devices (e.g. CPEs 142 in FIG. 1) connected to terminal 200 (e.g., through local network interface 240 in FIG. 2), referred to as desired data in the desired signal. ADC 415 converts the downconverted signal to a digital signal representative of the downconverted signal. In some embodiments, more than one LNA 405, downconverter 410, and ADC 415, referred to collectively as a desired signal tuner, can be included for receiving and tuning a plurality of desired signals from the received signal.

Matched filter 420 provides a defined filtering characteristic in order to properly shape the time domain representation of the symbols in the digital signal. I/Q balancer 425 adjusts the relative position of the recovered symbols amplitude, phase, and/or time based on an expected position of the symbols within a defined constellation map for encoding the modulation type in the received signal. Synch/channel estimator 430 detects specific portions of the digital signal to perform symbol timing synchronization and determine one or more of the transmit parameters used as part of encoding the transmitted signal. In some cases, synchronization information as well as transmit parameter information can be included in a specific portion of the signal such as part of a preamble or signal header.

Synch/channel estimator 430 also processes the digital signal to generate and maintain a continuous updated estimate of the amplitude and phase response of the digital signal as compared to a perfect, ideal, or expected received signal. Transmission of the signal from a satellite gateway uplink (e.g., RFT 122 included in gateway 120 in FIG. 1) up to a satellite (e.g., satellite 110) and back to the terminal can introduce a number of signal impairments that may additionally vary in time, including, but not limited to, nonstochastic noise, signal reflections and echoes, non-linear signal attenuation, etc. The estimate generated by synch/channel estimator 430 allows receiver 400 to compensate, correct, and/or mitigate the effects of the impairments introduced into the signal. The estimate can be generated and maintained in one or both of the time domain and the frequency domain.

Linear equalizer 435 corrects, to the extent possible, the presence of impairments in the digital signal based on the estimate provided from synch/channel estimator 430. Linear equalizer 435 processes the digital signal using a linear combination of scaled and delayed versions of the input digital to attempt to invert or cancel the presence of the impairment from the digital signal, often referred to as equalization. Non-linear equalizer 440 further corrects, to the extent possible, any remaining impairment errors still present in the digital signal after equalization in linear equalizer 435. Non-linear equalizer 440 corrects for those errors that cannot be addressed through only corrections of amplitude and/or phase performed in linear equalizer 435 without introducing an instability to the output response. Non-linear equalizer 440 can include additional feedback and feedforward conditional decision loops in order to ensure stability in the response while correcting for the effects or presence of the remaining portion of impairments in the digital signal. The I/Q balancer 425, synch/channel estimator 430, and linear equalizer 435 can be referred to as demodulation support elements that can collectively make up a circuit referred to as a demodulator. Each of these demodulation support elements can operate on specific effects and/or errors that are present in the received signal and introduced as a result of impairments during signal transmission. In some embodiments, more or fewer, as well as different demodulation support elements can be used based on the requirements of operation for the receiver.

Demapper/deinterleaver 445 demodulates the digital signal waveform by demapping the symbols into strings of bits. Demapper/deinterleaver 445 further deinterleaves the bits, rearranging bits with respect to position or location in a manner that reverses the interleaving process applied at the transmitter (e.g., in bit interleaver 340 in FIG. 3). LDPC/BCH decoder 450 processes the deinterleaved bitstream by first processing the redundant information inserted by the LDPC encoding process to identify and correct any correctable errors in the bitstream, and then processing the redundant information inserted by the BCH encoding process to identify and correct any additional correctable errors in the bitstream. Depending on the amount or rate of error correction applied as part of BCH and LDPC encoding, not all errors present in the bitstream can be identified and/or corrected by LDPC/BCH encoder 450. Data deblock 455 processes the decoded bitstream (with or without remaining errors), arranged in data blocks, to regenerate an estimate of the original source data as part of a transport stream. Data deblock 455 provides the transport stream to a processor, such as CPU 210 described in FIG. 2, for further processing and distribution. The transport stream includes desired data intended for, or associated with, the terminal and/or user devices interfaced to the terminal. In addition, the transport stream can also include data that is not destined for, or associated with, the terminal and/or user devices. Other processing, either in receiver 400 or in other elements of the terminal, can identify, parse, and/or discriminate the desired data from the undesired data in the transport stream.

LNA 405 can perform further processing to determine signal energy or level as well as noise energy or level. The determined values for signal energy and noise energy can be processed to generate signal characteristics for the received signal. LDPC/BCH decoder 450 can also provide datastream characterization information associated with the error correction process as part of decoding the received digital bitstream. The signal characteristics from LNA 405 as well as the datastream characterization information from LDPC/BCH decoder 450 can be used during ACM operation for signals transmitted using the DVB-S2 standard. Transmit parameter processor 460 can process the signal characteristics and/or datastream characterization as part of determining a set of transmit parameters that can be used for transmitting future data as part of a desired signal intended for reception in receiver 400 as part of a user terminal (e.g., terminal 200 in FIG. 2). Memory 465 can store any intermediate values as part of the processing and determination performed in transmit parameter processor 460. Memory 465 can also store any mapping that is created or defined based on a relationship between the transmit parameters as part of ACM, and any characterization information provided by LNA 405 and LDPC/BCH decoder 450.

Error cancellation module 470 receives the digitized and filtered input signal from matched filter 420 as a digital signal that represents the same digitized and filtered input signal after the input signal has been demodulated and decoded. The representative input signal is generated by providing the decoded bitstream from LDPC/BCH decoder 450 to symbol reconstructor 470. Symbol reconstructor 470 generates the representative signal, which can be referred to as a virtual or ideal input signal, by re-encoding the decoded bitstream using the same coding rate, re-interleaving the re-encoded bitstream using the same interleaving rate, and re-mapping the re-interleaved bitstream into symbols using the same mapping process applied to the originally transmitted signal. It is noted that symbol reconstructor 470 reverses a portion of the demodulation and decoding processing that was applied to the input signal in receiver 400. However, because data errors that were introduced due to signal impairments during transmission of the signal have been corrected or removed by LDPC/BCH decoder 450, the representative signal appears to be the same as the signal prior to its transmission by the gateway (e.g., satellite gateway 120 in FIG. 1).

Error cancellation module 470 generates a comparison of a data segment in the input signal from matched filter 420 and the same data segment in the representative input signal from symbol reconstructor 470 based on one or comparison functions or equations. A data segment can be a predefined size, such as a data block, or may be a variable size depending on modulation rate or other transmit parameters in the signal, and includes one or more data symbols. Portions of one or both of the input signal and the representative input signal can be stored and retrieved from memory 465, as needed, to account for processing time, signal delays or other latency present in receiver 400. The comparison functions or equations are used to generate a set of correction factors that can be applied to any one or more of I/Q balancer 425, synch/channel estimator 430, and linear equalizer 435 for use during processing of the next data segment. For example, the correction factors generated in error cancellation module 475 can be used to provide a new starting point for any feedback or feedforward control loops, often referred to as seeding. The new starting point can allow the control loop(s) to settle at an optimal, or near optimal, setting for correcting the specific error(s) introduced into the received signal due to impairments and handled by each of the demodulation support elements. In some cases, the settling time for the control loop(s) can be instantaneous or near instantaneous, depending on the difference between the errors present in the data segment processed in error cancellation module 475 and the next data segment.

In one embodiment, error cancellation module 475 can use comparison functions or equations based on deep learning functions. Deep learning functions are often associated with certain types of AI operations due to their ability to create solutions for complex multi-variable and often very different sets of relationships between events, signals, or results through behaviors. One such deep learning function is referred to as quality (Q)-learning based on a Markov decision process (MDP). Q-learning using an MDP can be described as follows. For a series of inputs X(n−1, n, n+1 . . . ) and a corresponding series of outputs Y(n−1, n, n+1 . . . ), a reward policy R(X(n+1), A) is formed, where A is a set of correction factors A(1) . . . A(N) as needed to form the reward policy. A set of dynamic models are adapted based on a relationship between the inputs X and the correction factors A. The MDP can use some form of an error value E based on a function $f(X, Y)$ as part of its learning to guide the adaptation of the reward policy R. The MDP can operate iteratively as part of the adaptation.

As applied to various embodiments, the MDP finds a policy, as a set of functions or equations, associated with the operation of the demodulation support elements that can maximize the expected value of a total reward of the current data segment over successive steps, starting from the difference or error between the input signal and representative input signal. The MDP does not apply a strict set of parameters to a model for the demodulation support elements and is permitted to freely adapt by forming a policy of actions that should be taken based, in part, on different circumstances and/or prior learning iterations. The maximum expected value of a total reward can often correspond to a minimum value of difference or error. In some cases, they can be different depending on information associated with changes between consecutive data segments.

Figure 5:
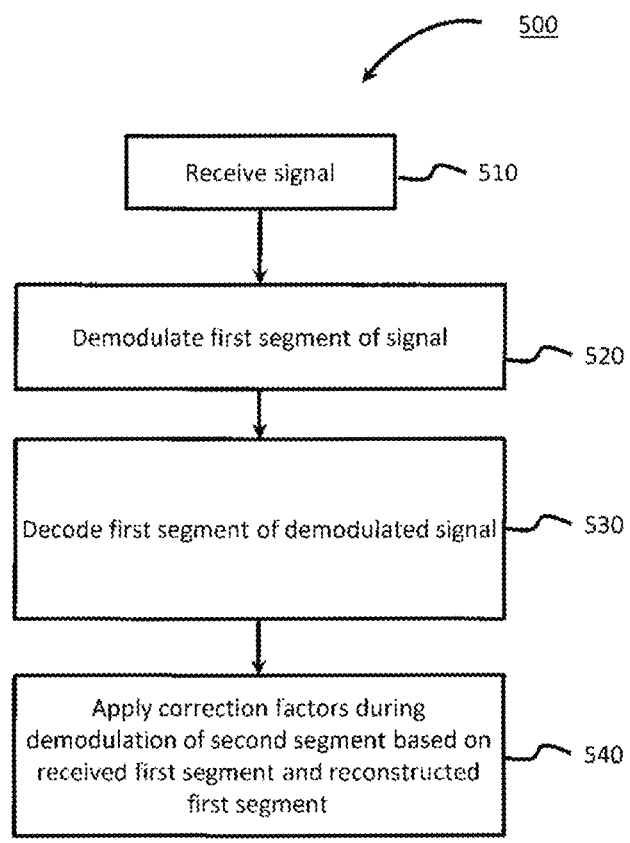
FIG. 5 is a flowchart of a process for demodulating and decoding a received signal, according to one embodiment.

FIG. 5 is a flowchart of an exemplary process 500 for demodulating and decoding a received signal, according to one embodiment. At step 510, a signal is received at terminal 200. The signal is transmitted through a satellite network from a gateway (e.g., satellite gateway 120 described in FIG. 1). More particularly, the gateway transmits the signal on an inroute direction to the terminal along a bent pipe path facilitated by the satellite. The signal can include a plurality of data segments. In some embodiments, the data segments can be arranged in some predetermined manner, such as in a continuous manner in time. Each of the data segments can be encoded using one or more different sets of transmit parameters in any arrangement and can include one or more data symbols based on transmit parameter encoding. Each of the data segments can be associated with a particular terminal and/or device supported by the gateway, including terminal 200. Furthermore, data segments associated with a particular terminal can be encoded with a set of transmit parameters specific to that terminal. For instance, five consecutive data segments associated with terminal 200 may be encoded using a first set of transmit parameters. The next ten consecutive data segments associated with other terminals may be encoded using a different set of transmit parameter, and so on.

At step 520, a first data segment in the received signal is demodulated. The demodulation can be performed, for example, in modem 260 or in a standalone demodulator circuit. According to an embodiment, the demodulator circuit can include downconversion, filtering, and demapping operations, similar to those described above. Step 520 can also include two or more additional demodulation support operations, such as I/Q balance correction, synchronization, transmission or link channel estimation, linear equalization, and non-linear equalization. At step 530, the first demodulated data segment is decoded using one or more forward error correction operations. As with the demodulation process (step 520), the decoding can be performed in modem 260 or in a standalone decoder that is separate from the demodulator circuit. The decoding can include, for example, deinterleaving, LDPC error correction decoding, and BCH error correction decoding operations as described above. Other types of decoding and/or forward error correction can also be used in addition to, or in place of, the operations mentioned here.

At step 540, a set of one or more error correction factors are applied to the demodulation support elements for use in demodulating a second data segment of the received signal. According to various embodiments, the set of error correction factors can be based on the original first data segment in the signal received, at step 510, and a representation of the first data segment that is reconstructed from the output bitstream produced by the decoding, at step 530. In some embodiments, the reconstruction can include re-encoding the bitstream and re-mapping the re-encoded bitstream into the one or more symbols contained as originally transmitted in the first data segment, as described above in FIG. 4. The reconstruction can also include, if needed, re-interleaving the re-encoded bitstream as described above. Further, in some embodiments, the correction factors applied, at step 540, can be generated by applying a learning algorithm to compare the received first data segment and the representation of the first data segment. The reconstruction and/or generation of correction factors can be performed in specific circuit elements (e.g., symbol reconstructor, error cancellation module, etc.). In other embodiments, the reconstruction and/or generation of correction factors can be performed in an application specific signal processing circuit or in a general processor configured to perform the operations.

According to additional embodiments, process 500 can be repeated for one or more subsequent data segments in the received signal. In some embodiments, process 500 can be performed only on data segments in the received signal that are intended for delivery and/or use by terminal 200 and not performed on data segments intended for delivery and use by other user terminals. Additionally, process 500 can be used in association with ACM operation in terminal 200, based on the signal demodulation improvements that can result from applying the correction factors. For example, a message can be generated and sent to the gateway for requesting that future data segments be encoded using a different set of transmit parameters (e.g., more robust or less robust).

Figure 6A:
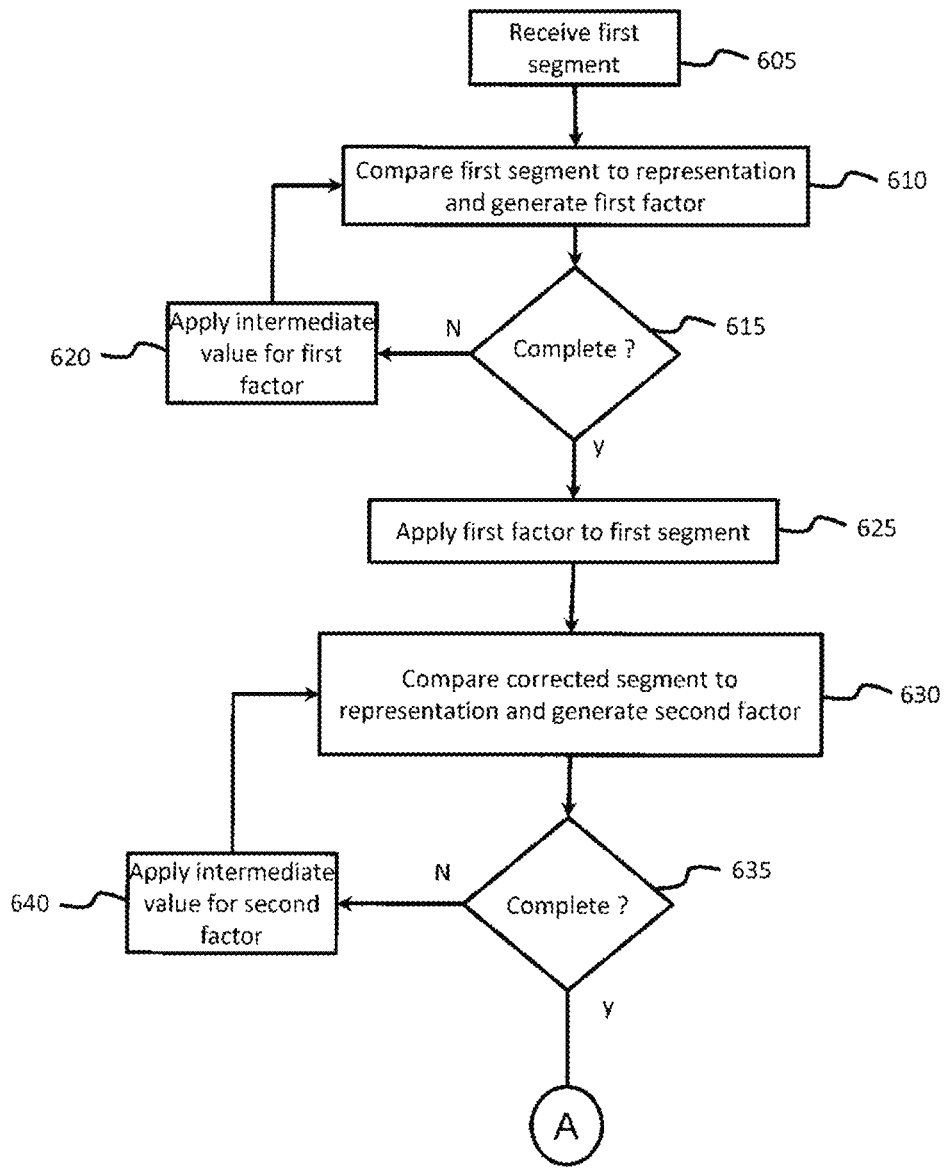
FIG. 6A and FIG. 6B are a flowchart of a process for generating a set of correction factors, according to at least one embodiment.
Figure 6B:
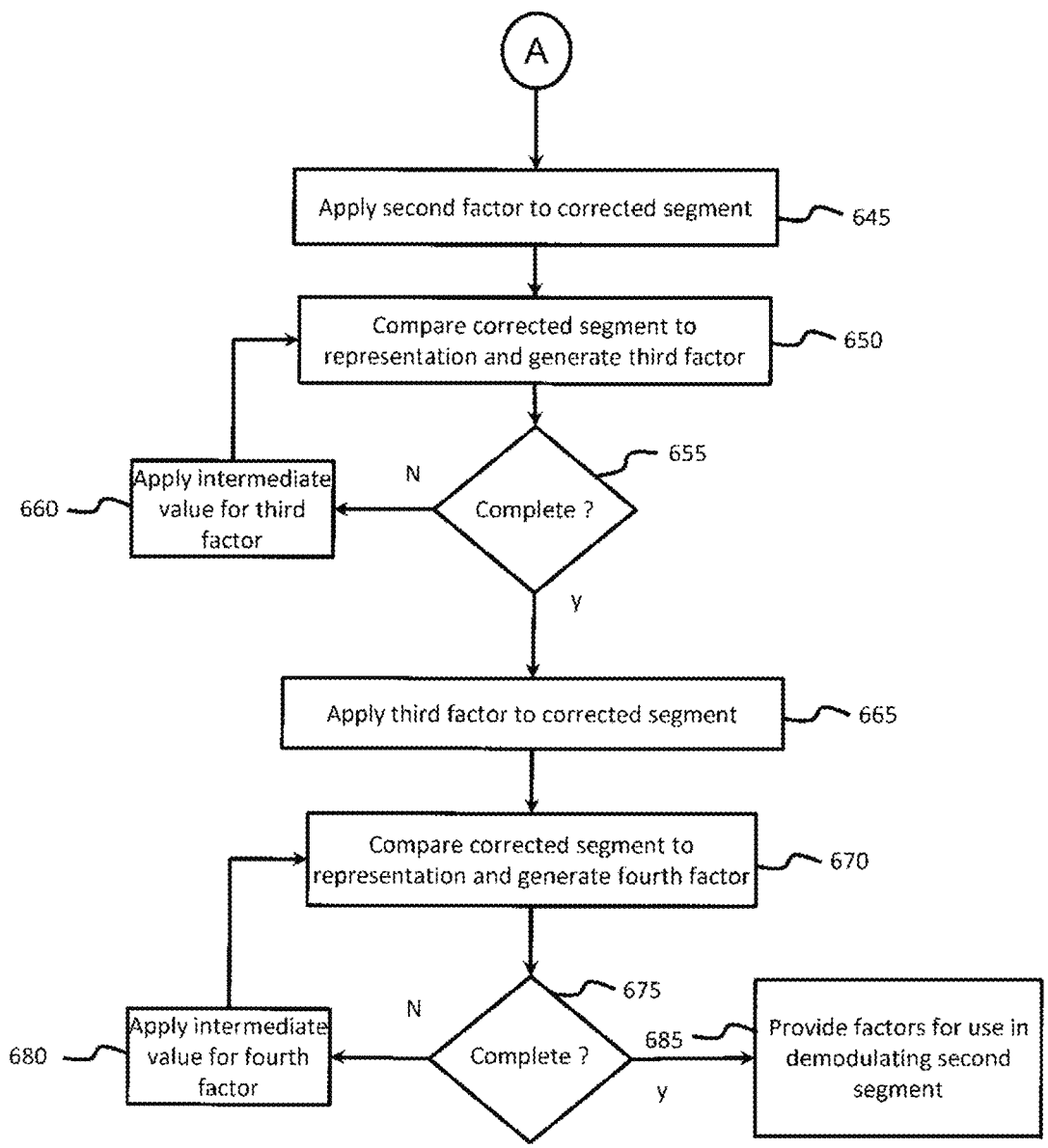

FIG. 6A and FIG. 6B are a flowchart of an exemplary process 600 for generating a set of correction factors, according to one embodiment. Although process 600 is described in relation to features of terminal 200 (described in FIG. 2) and receiver 400 (described in FIG. 4), it is not intended to be limited to such devices. Process 600 can equally be applied to operation in user terminal 200 described in FIG. 2 or to other stationary, transportable, and portable type terminal devices, such as terminals 140 and portable terminals 145 described in FIG. 1. Further, process 600 can be used in conjunction with one or more of the steps described for process 500 described in FIG. 5. For example, the correction factors generated at one or more of steps 610, 630, 650, and 670 in process 600 can be applied to demodulation support elements as described, at step 540.

At step 605, a first data segment from a signal input to a user terminal signal is received, for example, by error cancellation module 475. The received first data segment can be provided from matched filter 420 or can be retrieved from memory 465. At step 610, the first data segment is compared to a representation of the first data segment in order to generate a first correction factor. The representation of the first data segment is generated from the output bitstream of LDPC/BCH decoder 450 and reconstructed through symbol reconstructor 470. The representation of the first data segment can be provided directly from symbol reconstructor 470, or it can be retrieved from memory 465. In some additional embodiments, one or both of the received first data segment or the representation of the first data segment can be stored and retrieved from memory 465 to account for processing time, signal delays, or other latency present in receiver 400.

In one embodiment, the comparison and generation, at step 610, employs a form of deep learning using MDP to generate the first correction factor that can be applied to I/Q balancer 425. The reward policy in the MDP can be directed to the in-phase and quadrature signal representation of the input signal, or quadratures, that are properly oriented and uncorrupted. Properly oriented and uncorrupted quadratures will be orthogonal to each other, have equal energy, on average, in each quadrant of a two dimensional, or quadrature, signal graph, and have a total signal energy that is twice the energy of any one of the quadratures. One or more sets of rules or equations can subsequently be generated based on cross-correlations between quadrants or regions of a symbol constellation map for the first data segment. The first factor generated using MDP can also include information associated with data segments used for generating previous first correction factors.

At step 615 a determination is made as to whether the comparison and generation, at step 610, is complete. According to at least one embodiment, the determination can be based on one or more thresholds, such as a residual error threshold, established for the reward policy as part of the MDP. The determination, at step 615, can also be based on a time threshold, as needed to maintain continuous and sequential processing of subsequent data segments. If it is determined, at step 615, that the comparison is not complete, then the current value for the first correction factor is identified and applied, as an intermediate correction factor, at step 620. Process 600 returns to 610 for additional comparison and generation processing. If it is determined, at step 615, that the comparison and generation, at step 610, is complete based on established goals or thresholds, then, at step 625, the generated first factor is applied to the first data segment from the input signal. According to an embodiment, the first factor can be applied to the first data segment to account for the change in signal characteristics of the first data segment in much the same way as the appropriate demodulation support element (e.g., I/Q balancer 425) would perform when applying the first correction factor.

At step 630, the corrected first data segment is again compared to the representation of the first data segment in order to generate a second correction factor. In one embodiment, the comparison and generation, at step 630, employs a form of deep learning using MDP to generate the second correction factor that can be applied to synch/channel estimator 430. The reward policy in the MDP can be directed to the correction or elimination of undesired continuing signal rotation due to errors between the carrier frequency for the input signal and carrier frequency oscillator used in receiver 400, or errors between the clock frequency for the input signal and the frequency used for the clock in receiver 400. The errors may be static (i.e., based only on absolute stable frequency) or dynamic (i.e., based only on a changing, unstable, or random moving frequency). One or more sets of rules or equations can be generated based on correcting the rotation of the signal for the first data segment based identifying and separation carrier frequency rotation from clock rotation and applying an appropriate frequency or phase shift to the signal. The MDP can also include information associated with data segments used for generating previous second correction factors.

At step 635 a determination is made as to whether the comparison and generation, at step 630, is complete. The determination can be made based on similar goals and thresholds as described above, at step 615. If the comparison is not complete, then the current value for the second correction factor is identified and applied as an intermediate correction factor, at step 640. Process 600 returns to step 630 for additional comparison and generation processing. If it is determined, at step 635, that the comparison and generation is complete, then at step 645, the generated second factor is applied to the first data segment from the input signal that was modified at step 625. The second factor is applied to the modified first data segment to account for the change in signal characteristics of the modified first data segment in much the same way as the appropriate demodulation support element (e.g., synch/channel estimator 430) would perform when applying the second correction factor.

At step 650, the modified first data segment, with the second correction factor applied, is again compared to the representation of the first data segment in order to generate a third correction factor. In one embodiment, the comparison and generation, at step 650, employs a form of deep learning using MDP to generate the third correction factor for use by linear equalizer 435. The reward policy in the MDP can be directed to the correction or elimination of amplitude and phase varying replicas of the input signal that are received along with the input signal. The replicas are caused by memory effects in the transmission channel, such as reflections, dispersal, and doppler shift. Each of the replicas can be expressed as a mathematical expression that is the same as that for the input signal but with a different amplitude and/or phase value. The addition of these replicas can be identified by a change in the expected amplitude and/or phase component of the frequency response of the input signal. Next, one or more sets of rules or equations can be generated based on correcting the amplitude and/or phase components of the frequency response of the signal for the modified first data segment using additional amplitude and phase shifted versions of the signal for cancelling or removing the replicas. The MDP can also include information associated with data segments used for generating previous third correction factors.

At step 655 a determination is made as to whether the comparison and generation, at step 650, is complete. The determination can be made based on similar goals and thresholds as described above, at step 615. If it is determined that the comparison is not complete, then the current value for the third correction factor is identified and applied, as an intermediate correction factor, at step 660. Control returns to step 650. If it is determined that the comparison and generation is complete, then, at step 665, the generated third factor is applied to the first data segment from the input signal that was modified at step 645. The third factor is applied to the modified first data segment to account for the change in signal characteristics of the first data segment in much the same way in much the same way as the appropriate demodulation support element (e.g., linear equalizer 435) would perform when applying the third correction factor.

At step 670 the modified first data segment, with the third correction factor applied at step 665, is again compared to the representation of the first data segment in order to generate a fourth correction factor. According to at least one embodiment, the comparison and generation, at step 670, employs a form of deep learning using MDP to generate the fourth correction factor that can be applied to non-linear equalizer 440. The reward policy in the MDP can be directed to the correction or elimination of non-linear terms present in the signal for the modified data segment based on a signal expansion representation. A non-linear signal can be represented by a mathematical expression based on one of several possible memory polynomial expansion models. An ideal signal (e.g., the signal for the representation of the first data segment), without non-linear components, will have coefficient values for the polynomial expansion model that, in many cases, can be at or near zero. One or more sets of rules or equations can subsequently be generated based on fitting the input signal, modified with the previous correction factors, to the terms of one or more polynomial expansion models and identifying the differences to the coefficient values for the ideal signal. The MDP can also include information associated with data segments used for generating previous fourth correction factors.

At step 675 a determination is made as to whether the comparison and generation is complete. The determination can be made based on similar goals and thresholds as described above, at step 615. If it is determined that the comparison is not complete, then the current value for the fourth correction factor is identified and applied, as an intermediate correction factor, at step 680. Process 600 returns to step 670 for additional comparison and generation processing. If it is determined that the comparison and generation is complete, then, at step 685, the four correction factors generated at steps 610, 630, 650, and 670 are provided for use in demodulating a different or second data segment in the input signal to the user terminal (e.g., terminal 200 described in FIG. 2).

Although process 600 is described as creating four correction factors, each comparison and generation step (e.g., steps 610, 630, 650, and 670) can create more than one correction factor for a demodulation support circuit. Process 600 can additionally be modified to accommodate creation of one or more correction factors for more or fewer demodulation support elements than the four previously described. In additional embodiments, one or more steps of process 600 can be performed partly, or completely, in parallel. For instance, where timely completion of process 600 is necessary to maintain the processing of incoming data segments, the comparison and generation, at steps 610, 630, 650, and 670, can be performed in parallel with modification to the determinations at steps 615, 635, 655, and 675. In further embodiments, the application of techniques, such as deep learning and MDP, can further allow recursive processing between the comparison and generation performed at steps 610, 630, 650, and 670.

Figure 7:
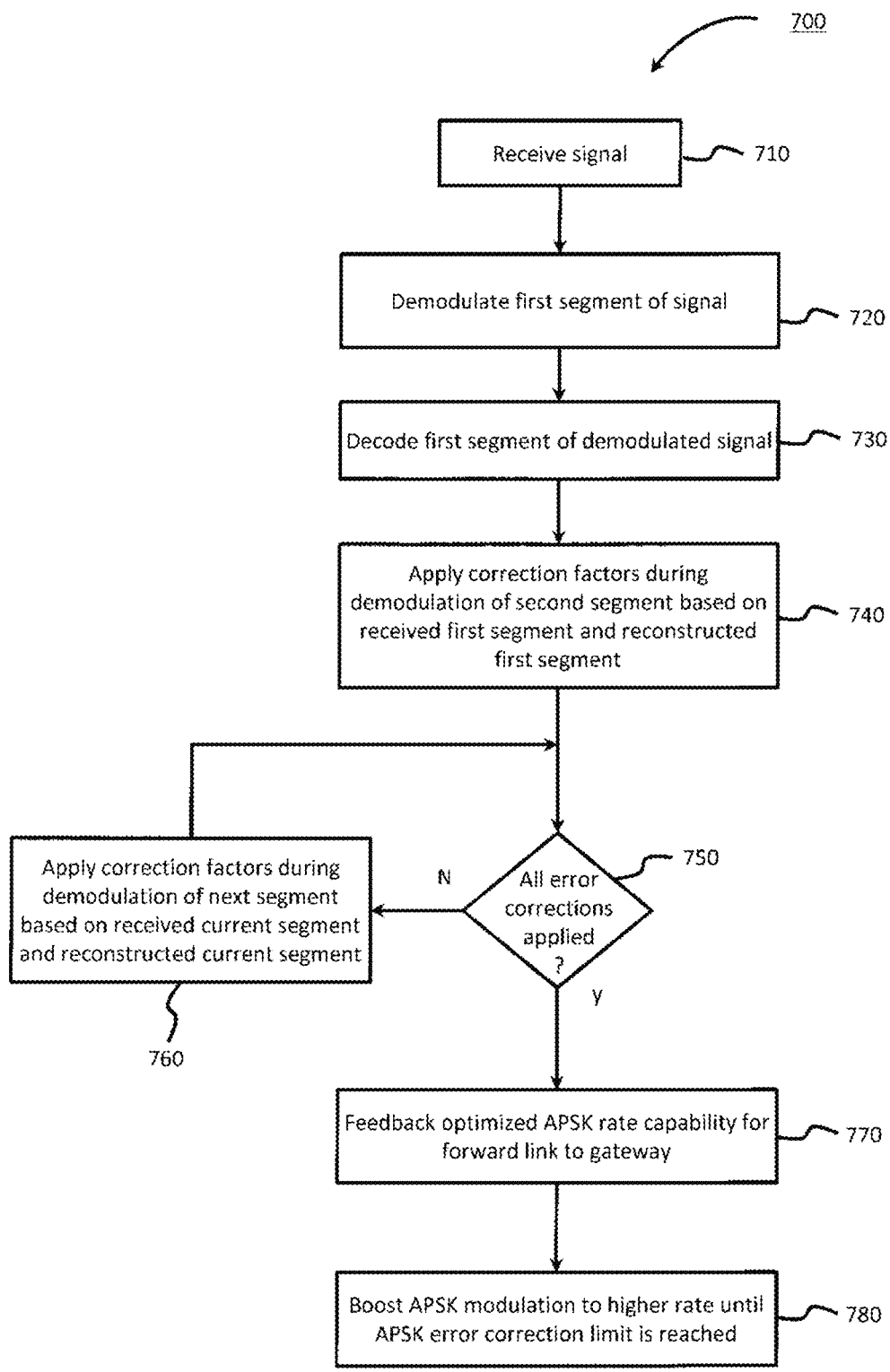
FIG. 7 is a flowchart of a process for demodulating and decoding a received signal, according to at least one embodiment.

FIG. 7 is a flowchart of an exemplary process 700 for demodulating and decoding a received signal, according to one embodiment. At step 710, a signal is received at terminal 200. According to one or more embodiments, the signal can include a plurality of data segments. Each of the data segments can be encoded using one or more different sets of transmit parameters in any arrangement and can include one or more data symbols based on transmit parameter encoding. Each of the data segments can also be associated with a particular terminal and/or device supported by the gateway, including terminal 200. At step 720, a first data segment in the received signal is demodulated. The demodulation can be performed, for example, in modem 260 or in a standalone demodulator circuit. According to an embodiment, the demodulator ion circuit can include downconversion, filtering, and demapping operations, as well as demodulation support operations, such as I/Q balance correction, synchronization, transmission or link channel estimation, linear equalization, and non-linear equalization. At step 730, the first demodulated data segment is decoded using one or more forward error correction operations. As with the demodulation (step 720), the decoding can be performed in modem 260 or in a standalone decoder that is separate from the demodulator circuit. The decoding can include, for example, deinterleaving, LDPC error correction decoding, and BCH error correction decoding operations as described above. Other types of decoding and/or forward error correction can also be used in addition to, or in place of, the operations mentioned here.

At step 740, a set of one or more error correction factors are applied to the demodulation support elements for use in demodulating a second data segment of the received signal. According to various embodiments, the set of error correction factors can be based on the original first data segment in the signal received, at step 710, and a representation of the first data segment that is reconstructed from the output bitstream produced by the decoding, at step 730. In some embodiments, the reconstruction can include re-encoding the bitstream and re-mapping the re-encoded bitstream into the one or more symbols contained as originally transmitted in the first data segment, as described above in FIG. 4. The reconstruction can also include, if needed, re-interleaving the re-encoded bitstream as described above. According to at least one embodiment, the correction factors can be generated using the process shown in FIGS. 6A and 6B

At step 750, it is determined if all the correction factors for the terminal have been applied. If additional correction factors remain, then some or all of the remaining correction factors are applied during demodulation of the next segment at step 760. As previously discussed the correction factors may be applied based on both the received and reconstructed current segments. Process 700 then returns to step 750. If all the correction factors have been applied, then at step 770 the terminal provides feedback pertaining to its optimized APSK rate capability. At step 780, the gateway boosts the APSK modulation rate for the terminal to higher modulation rate until the APSK error correction limit for the terminal is reached. Such features advantageously allow an increase in the data transmission speed from 4 to 64 times higher, depending on the current link conditions. Although not shown in FIG. 7, this process can be applied by all active terminals in order to maximize data transmission with their respective gateways.

Figure 8:
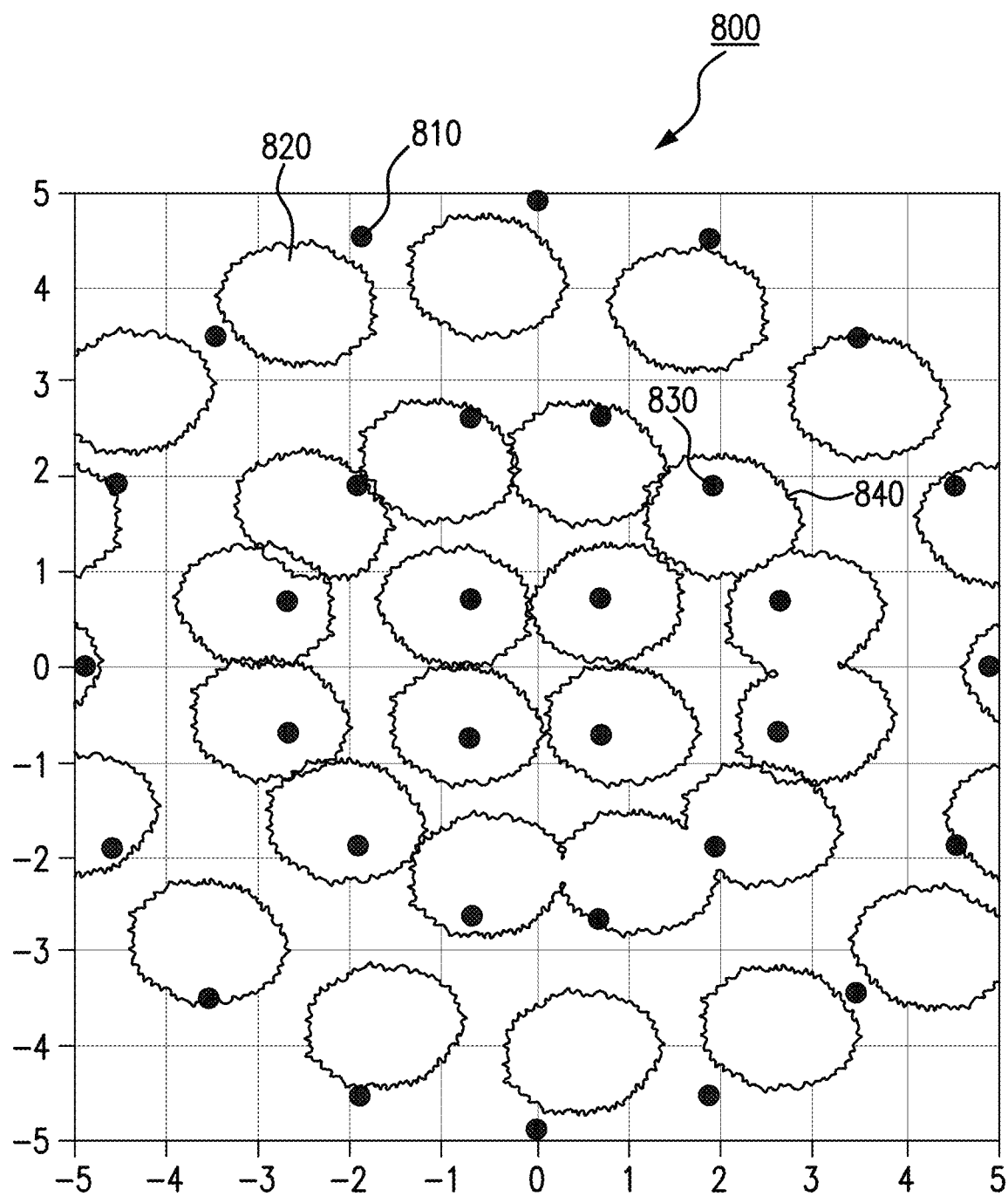
FIG. 8 is a diagram of a constellation map for a received signal, according to one or more embodiments.

FIG. 8 is an exemplary diagram 800 illustrating a constellation map for a received signal, according to an embodiment. Diagram 800 illustrates a constellation map for a signal encoded using 32 APSK modulation and transmitted to a terminal. Diagram 800 shows the results of receiving and demodulation a plurality of each of the possible symbols in the received signal plotted as a constellation map over a period of time, without applying the correction factors as described above. Diagram 800 also includes symbol location markers, illustrated as black dots, located at the proper positions in the constellation map for each of the 32 different possible symbols. Diagram 800 illustrates the signal errors, with respect to symbol position, that remain even after normal demodulation. For example, element 810 shows a proper position for a symbol and element 820 shows the plurality of positions for the same symbol in the received signal having a large range with no symbols actually having the proper position at element 810. As another example, element 830 shows a proper position for a different symbol and element 840 shows the plurality of positions for that same symbol in the received signal still having a large range and not centered around the proper position.

Figure 9:
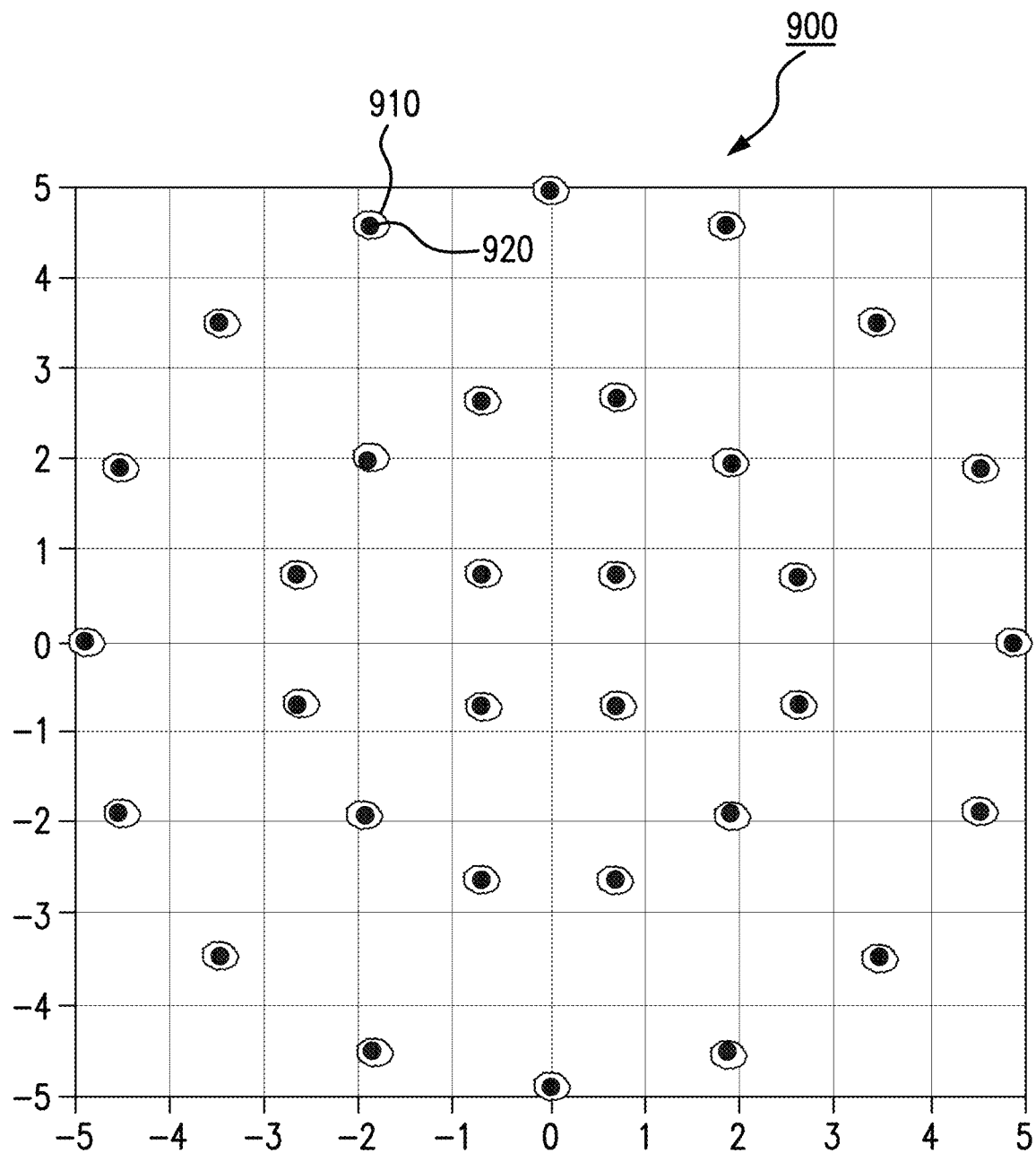
FIG. 9 is a diagram of another constellation map for a received signal, according to one or more embodiments.

FIG. 9 is an exemplary diagram 900 illustrating a constellation map for a received signal after applying correction factors as part of demodulating a signal, according to an embodiment. Diagram 900 shows the same constellation map as in diagram 800 for a signal encoded using 32 APSK. Diagram 900 shows the results of receiving and demodulating a plurality of each of the possible symbols plotted onto a constellation map using a receiving circuit with correction factors applied to demodulation support circuits. Similar to FIG. 8, symbol location markers, illustrated as black dots, are shown at the proper positions in the constellation map for each of the 32 different possible symbols. Diagram 900 illustrates that the application of the correction factors to the demodulation support elements has improved the accuracy of the position for the symbols, relative to their ideal or proper position, after demodulation. For example, element 910 shows a proper position for the same symbol as element 810 above, and element 920 shows the plurality of positions for that same symbol in the received signal now having a very small range of positions grouped and tightly centered around element 910.

Various features described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Furthermore, various features can be implemented using algorithms illustrated in the form of flowcharts and accompanying descriptions. Some or all steps associated with such flowcharts can be performed in a sequence independent manner, unless otherwise indicated. Those skilled in the art will also understand that features described in connection with one Figure can be combined with features described in connection with another Figure. Such descriptions are only omitted for purposes of avoiding repetitive description of every possible combination of features that can result from the disclosure.

The terms software, computer software, computer program, program code, and application program may be used interchangeably and are generally intended to include any sequence of machine or human recognizable instructions intended to program/configure a computer, processor, server, etc. to perform one or more functions. Such software can be rendered in any appropriate programming language or environment including, without limitation: C, C++, C#, Python, R, Fortran, COBOL, assembly language, markup languages (e.g., HTML, SGML, XML, VoXML), Java, JavaScript, etc. As used herein, the terms processor, microprocessor, digital processor, and CPU are meant generally to include all types of processing devices including, without limitation, single/multi-core microprocessors, digital signal processors (DSPs), reduced instruction set computers (RISC), general-purpose (CISC) processors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components. Such exemplary hardware for implementing the described features are detailed below.

Figure 10:
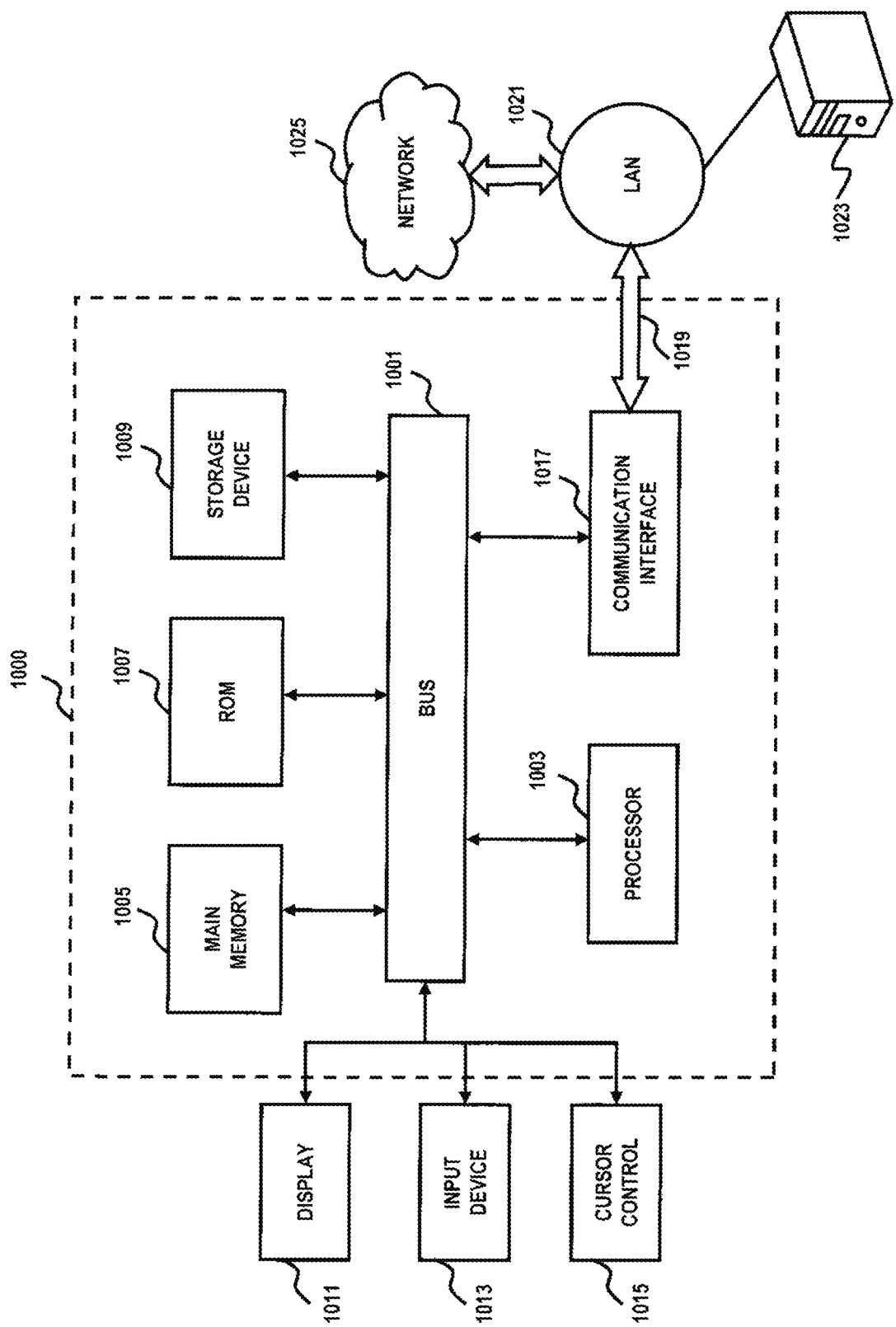
FIG. 10 is a diagram of a computer system that can be used to implement various exemplary features and embodiments.

FIG. 10 is a diagram of a computer system 1000 that can be used to implement various exemplary features and embodiments. The computer system 1000 includes a bus 1001 or other communication mechanism for communicating information and a processor 1003 coupled to the bus 1001 for processing information. The computer system 1000 also includes main memory 1005, such as (RAM), dynamic RAM (DRAM), synchronous dynamic RAM (SDRAM), double data rate SDRAM(DDR SDRAM), DDR2 SDRAM, DDR3 SDRAM, DDR4 SDRAM, etc., or other dynamic storage device (e.g., flash RAM), coupled to the bus 1001 for storing information and instructions to be executed by the processor 1003. Main memory 1005 can also be used for storing temporary variables or other intermediate information during execution of instructions by the processor 1003. The computer system 1000 may further include a ROM 1007 or other static storage device coupled to the bus 1001 for storing static information and instructions for the processor 1003. A storage device 1009, such as a magnetic disk or optical disk, is coupled to the bus 1001 for persistently storing information and instructions.

The computer system 1000 may be coupled via the bus 1001 to a display 1011, such as a light emitting diode (LED) or other flat panel displays, for displaying information to a computer user. An input device 1013, such as a keyboard including alphanumeric and other keys, is coupled to the bus 1001 for communicating information and command selections to the processor 1003. Another type of user input device is a cursor control 1015, such as a mouse, a trackball, or cursor direction keys, for communicating direction information and command selections to the processor 1003 and for controlling cursor movement on the display 1011. Additionally, the display 1011 can be touch enabled (i.e., capacitive or resistive) in order to facilitate user input via touch or gestures.

According to an exemplary embodiment, the processes described herein are performed by the computer system 1000, in response to the processor 1003 executing an arrangement of instructions contained in main memory 1005. Such instructions can be read into main memory 1005 from another computer-readable medium, such as the storage device 1009. Execution of the arrangement of instructions contained in main memory 1005 causes the processor 1003 to perform the process steps described herein. One or more processors in a multi-processing arrangement may also be employed to execute the instructions contained in main memory 1005. In alternative embodiments, hard-wired circuitry may be used in place of or in combination with software instructions to implement exemplary embodiments. Thus, exemplary embodiments are not limited to any specific combination of hardware circuitry and software.

The computer system 1000 also includes a communication interface 1017 coupled to bus 1001. The communication interface 1017 provides a two-way data communication coupling to a network link 1019 connected to a local network 1021. For example, the communication interface 1017 may be a digital subscriber line (DSL) card or modem, an integrated services digital network (ISDN) card, a cable modem, fiber optic service (FiOS) line, or any other communication interface to provide a data communication connection to a corresponding type of communication line. As another example, communication interface 1017 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 1017 sends and receives electrical, electromagnetic, or optical signals that carry digital data streams representing various types of information. Further, the communication interface 1017 can include peripheral interface devices, such as a Universal Serial Bus (USB) interface, a High Definition Multimedia Interface (HDMI), etc. Although a single communication interface 1017 is depicted in FIG. 10, multiple communication interfaces can also be employed.

The network link 1019 typically provides data communication through one or more networks to other data devices. For example, the network link 1019 may provide a connection through local network 1021 to a host computer 1023, which has connectivity to a network 1025 such as a wide area network (WAN) or the Internet. The local network 1021 and the network 1025 both use electrical, electromagnetic, or optical signals to convey information and instructions. The signals through the various networks and the signals on the network link 1019 and through the communication interface 1017, which communicate digital data with the computer system 1000, are exemplary forms of carrier waves bearing the information and instructions.

The computer system 1000 can send messages and receive data, including program code, through the network (s), the network link 1019, and the communication interface 1017. In the Internet example, a server (not shown) might transmit requested code belonging to an application program for implementing an exemplary embodiment through the network 1025, the local network 1021 and the communication interface 1017. The processor 1003 may execute the transmitted code while being received and/or store the code in the storage device 1009, or other non-volatile storage for later execution. In this manner, the computer system 1000 may obtain application code in the form of a carrier wave.

The term "computer-readable medium" as used herein refers to any medium that participates in providing instructions to the processor 1003 for execution. Such a medium may take many forms, including but not limited to non-volatile media, volatile media, and transmission media. Non-volatile media include, for example, optical or magnetic disks, such as the storage device 1009. Non-volatile media can further include flash drives, USB drives, micro secure digital (SD) cards, etc. Volatile media include dynamic memory, such as main memory 1005. Transmission media include coaxial cables, copper wire and fiber optics, including the wires that comprise the bus 1001. Transmission media can also take the form of acoustic, optical, or electromagnetic waves, such as those generated during radio frequency (RF) and infrared (IR) data communications. Common forms of computer-readable media include, for example, a USB drive, microSD card, hard disk drive, solid state drive, optical disk (e.g., digital versatile disk (DVD), DVD read write (DVD RW), Blu-ray), or any other medium from which a computer can read.

Figure 11:
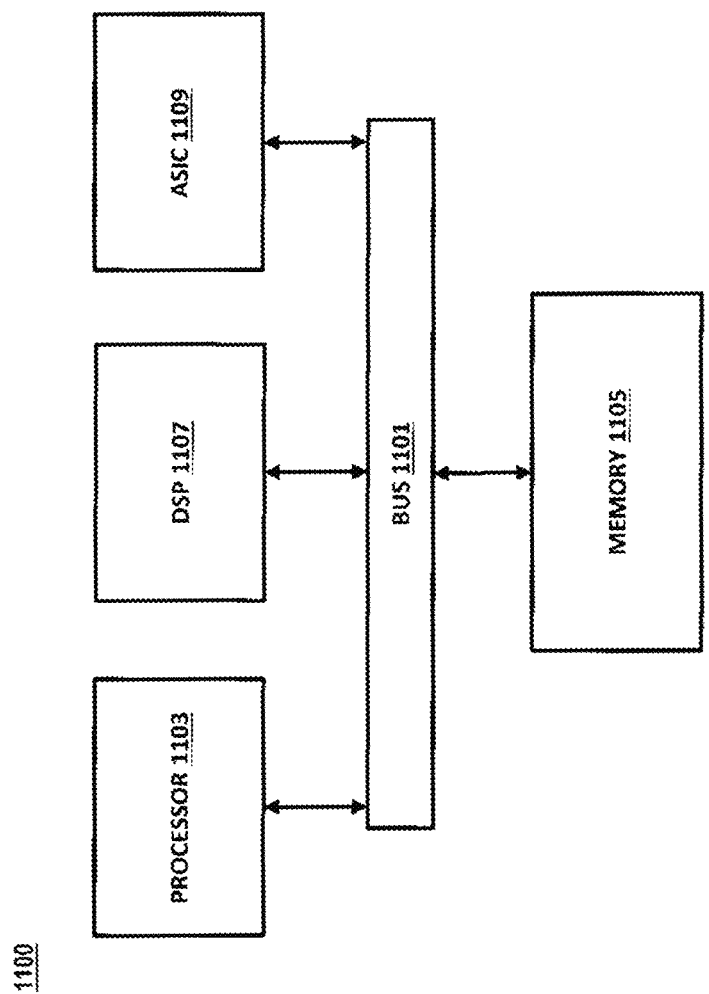
FIG. 11 is a diagram of a chip set that can be used to implement various exemplary features and embodiments.

FIG. 11 illustrates a chip set 1100 upon which features of various embodiments may be implemented. Chip set 1100 is programmed to implement various features as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1100, or a portion thereof, constitutes a means for performing one or more steps of the figures.

In one embodiment, the chip set 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to perform specialized functions not easily performed by a general purpose processor. Other specialized components to aid in performing the inventive functions described herein include one or more field programmable gate arrays (FPGA) (not shown), one or more controllers (not shown), or one or more other special-purpose computer chips.

The processor 1103 and accompanying components have connectivity to the memory 1105 via the bus 1101. The memory 1105 includes both dynamic memory (e.g., RAM, magnetic disk, re-writable optical disk, etc.) and static memory (e.g., ROM, CD-ROM, DVD, BLU-RAY disk, etc.) for storing executable instructions that when executed perform the inventive steps described herein. The memory 1105 also stores the data associated with or generated by the execution of the inventive steps.

While certain exemplary embodiments and implementations have been described herein, other embodiments and modifications will be apparent from this description. Accordingly, the various embodiments described are not intended to be limiting, but rather are encompassed by the broader scope of the presented claims and various obvious modifications and equivalent arrangements.

What is claimed is:

1. A method comprising:
   receiving a signal including a plurality of data segments;
   demodulating a first data segment in the received signal;
   decoding the demodulated first data segment to produce a recovered segment of a bitstream; and
   applying at least one correction factor to a first demodulation support element and a second demodulation support element during demodulation of a second data segment in the received signal, the at least one correction factor being based on the received first data segment and a representation of the first data segment reconstructed from the recovered segment of the bitstream;
   applying a deep learning algorithm to compare the received first data segment and the representation of the first data segment; and
   generating the at least one correction factor for the first demodulation support element and the second demodulation support element using the received first data segment and the representation of the first data segment,
   wherein the first demodulation support element is an I/Q balancer and the second demodulation support element is a signal synchronizer.

2. The method of claim 1, wherein each of the plurality of data segments includes at least one data symbol.

3. The method of claim 1, further comprising reconstructing the representation of the first data segment, the reconstructing comprising re-encoding the recovered segment of the bitstream and re-mapping the re-encoded segment of the bitstream to at least one data symbol in the representation of the first data segment.

4. The method of claim 1, further comprising:
   supplying feedback to a transmitter which transmits the signal, the feedback specifying, in part, an optimized APSK modulation rate capability; and
   boosting, by the transmitter, the APSK modulation to a higher rate.

5. The method of claim 1, wherein the deep learning algorithm comprises:
   generating a first correction factor for the first demodulation support element based on a comparison of the received first data segment to the representation of the first data segment; and
   generating a second correction factor for the second demodulation support element based on a comparison of the received first data segment to a representation of the first data segment, after the first correction factor has been applied to the received first data segment.

6. The method of claim 1, wherein the applying at least one correction factor further includes applying at least one correction factor to a third demodulation support element and a fourth demodulation support element using the received first data segment and the representation of the first data segment.

7. The method of claim 6, wherein the third demodulation support element is a linear equalizer, and the fourth demodulation support element is a non-linear equalizer.

8. The method of claim 7, wherein the deep learning algorithm comprises:
   generating at least one correction factor for the I/Q balancer based on a comparison of the received first data segment to a representation of the first data segment;
   generating at least one correction factor for the signal synchronizer based on a comparison of the received first data segment to a representation of the first data segment, the received first data segment further including the generated at least one correction factor for the I/Q balancer;
   generating at least one correction factor for the linear equalizer based on a comparison of the received first data segment to a representation of the first data segment, the received first data segment including the generated at least one correction factor for the I/Q balancer and signal synchronizer; and
   generating at least one correction factor for the non-linear equalizer based on a comparison of the received first data segment to a representation of the first data segment, the received first data segment including the generated at least one correction factor for the I/Q balancer, signal synchronizer, and linear equalizer.

9. The method of claim 1, wherein the second data segment is received at a time after receiving the first data segment.

10. The method of claim 1, wherein the first data segment and the second data segment are encoded using a first set of transmit parameters, and further comprising:
    requesting transmission of subsequent data segments in the signal,
    wherein the subsequent data segments are encoded using a second set of transmit parameters, the second set of transmit parameters being less robust than the first set of transmit parameters.

11. An apparatus comprising:
    an input circuit that receives a signal including a plurality of data segments;
    a demodulator coupled to the input circuit, the demodulator demodulating a first data segment in the received signal;
    a decoder coupled to the demodulator, the decoder decoding the demodulated first data segment to produce a recovered segment of a bitstream; and
    an error cancellation module coupled to the demodulator and the decoder, the error cancellation module being configured to:

apply at least one correction factor to a first demodulation support element and a second demodulation support element during demodulation of a second data segment of the signal, the correction factor being based on the received first data segment and a representation of the first data segment reconstructed from the recovered segment of the bitstream, apply a deep learning algorithm to compare the received first data segment and the representation of the first data segment; and generate the at least one correction factor for the first demodulation support element and the second demodulation support element using the received first data segment and the representation of the first data segment, wherein the first demodulation support element is an I/Q balancer and the second demodulation support element is a signal synchronizer.

12. The apparatus of claim 11, further comprising a symbol reconstructor, coupled to the decoder and the error cancellation module, the symbol reconstructor re-encoding the recovered segment of the bitstream and re-mapping the re-encoded segment of the bitstream to at least one data symbol in the representation of the first data segment.

13. The apparatus of claim 11, wherein the deep learning algorithm generates a first correction factor for the first demodulation support element based on a comparison of the received first data segment to the representation of the first data segment and generates a second correction factor for the second demodulation support element based on a comparison of the received first data segment to a representation of the first data segment, the received first data segment further including the generated first correction factor.

14. The apparatus of claim 11, wherein the error cancellation module further applies at least one correction factor to a third demodulation support element and a fourth demodulation support element using the received first data segment and the representation of the first data segment.

15. The apparatus of claim 14, wherein the third demodulation support element is a linear equalizer, and the fourth demodulation support element is a non-linear equalizer.

16. The apparatus of claim 11, wherein the error cancellation module is configured to apply the deep learning algorithm to:

generate at least one correction factor for the I/Q balancer based on a comparison of the received first data segment to a representation of the first data segment, generate at least one correction factor for the signal synchronizer based on a comparison of the received first data segment to a representation of the first data segment, the received first data segment further including the generated at least one correction factor for the I/Q balancer, generate at least one correction factor for the linear equalizer based on a comparison of the received first data segment to a representation of the first data segment, the received first data segment including the generated at least one correction factor for the I/Q balancer and signal synchronizer, and generate at least one correction factor for the non-linear equalizer based on a comparison of the received first data segment to a representation of the first data segment, the received first data segment including the generated at least one correction factor for the I/Q balancer, signal synchronizer, and linear equalizer.

17. The apparatus of claim 11, wherein the second data segment is received at a time after receiving the first data segment.

18. The apparatus of claim 11, wherein:

the first data segment and the second data segment are encoded using a first set of transmit parameters;

the apparatus is configured to request transmission of subsequent data segments in the signal; and the subsequent data segments are encoded using a second set of transmit parameters, the second set of transmit parameters being less robust than the first set of transmit parameters.

* * * * *